Figure 3:
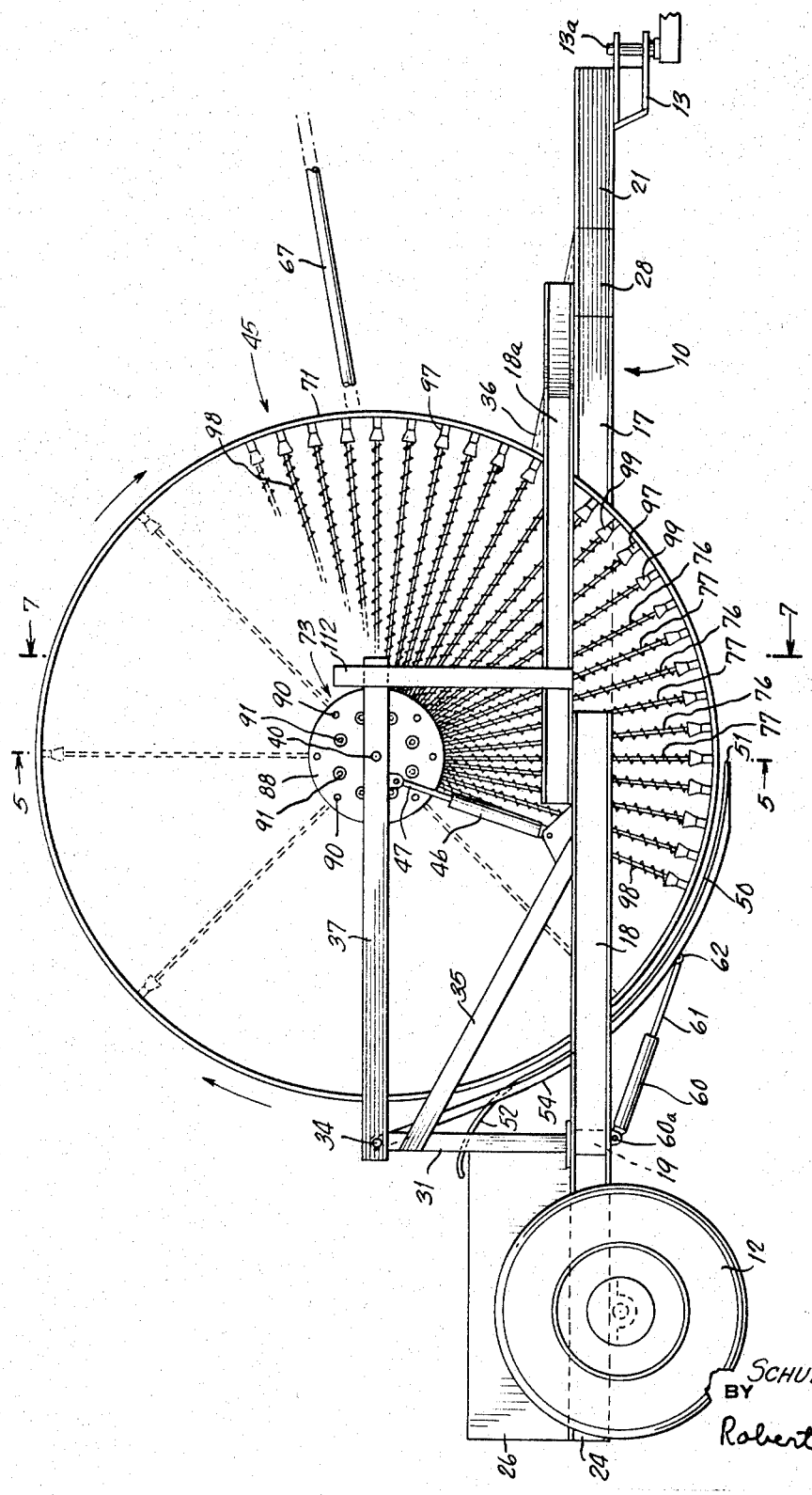

Dec. 10, 1968     S. M. HIBBARD     3,415,045
HARVESTING APPARATUS AND METHOD
Filed July 7, 1966     5 Sheets-Sheet 1
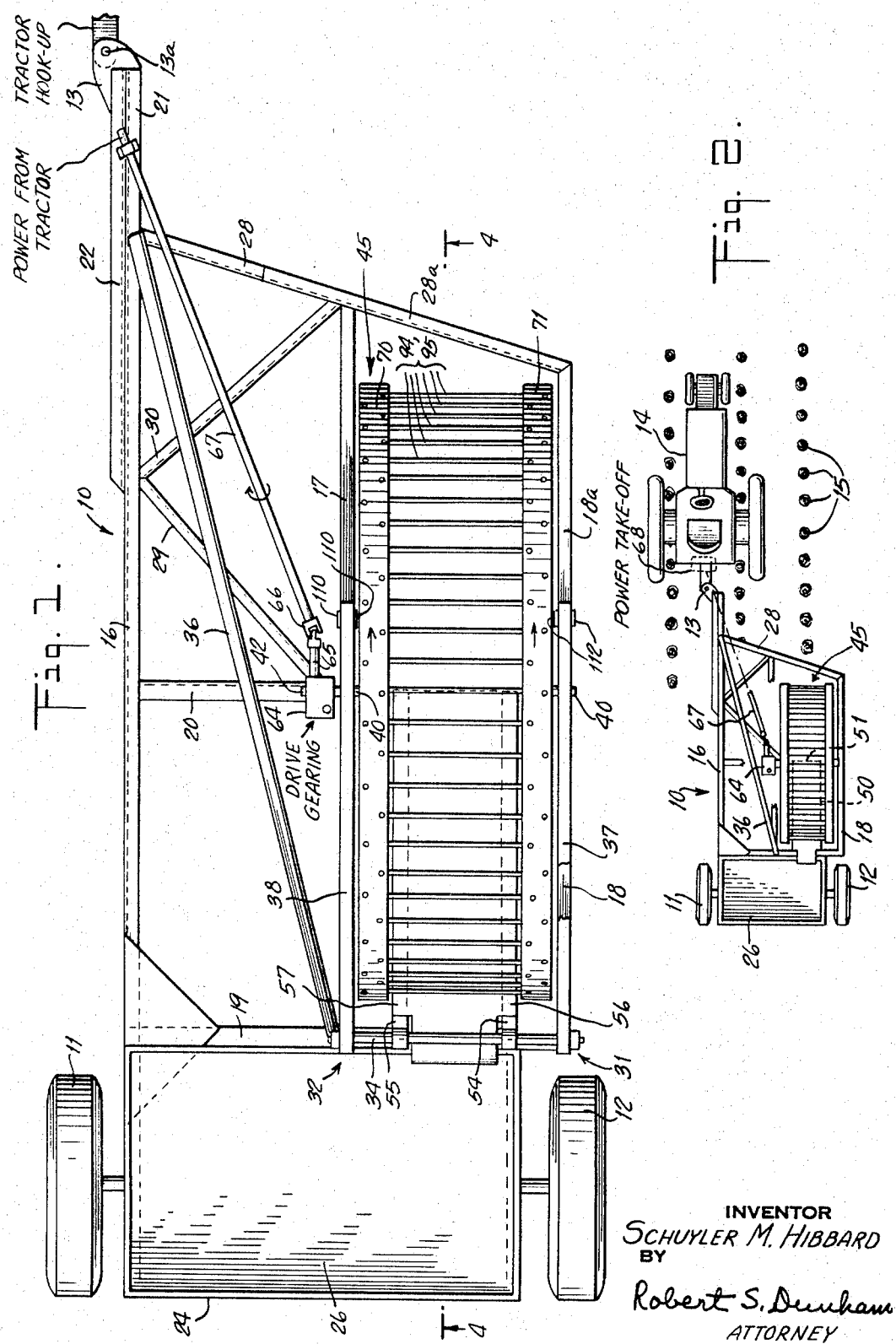
INVENTOR
SCHUYLER M. HIBBARD
BY
Robert S. Dunham
ATTORNEY INVENTOR
SCHUYLER M. HIBBARD
BY
Robert S. Dunham
ATTORNEY Dec. 10, 1968

S. M. HIBBARD 3,415,045

HARVESTING APPARATUS AND METHOD

Filed July 7, 1966

5 Sheets-Sheet 3

INVENTOR
SCHUYLER M. HIBBARD
BY
Robert S. Dunham
ATTORNEY

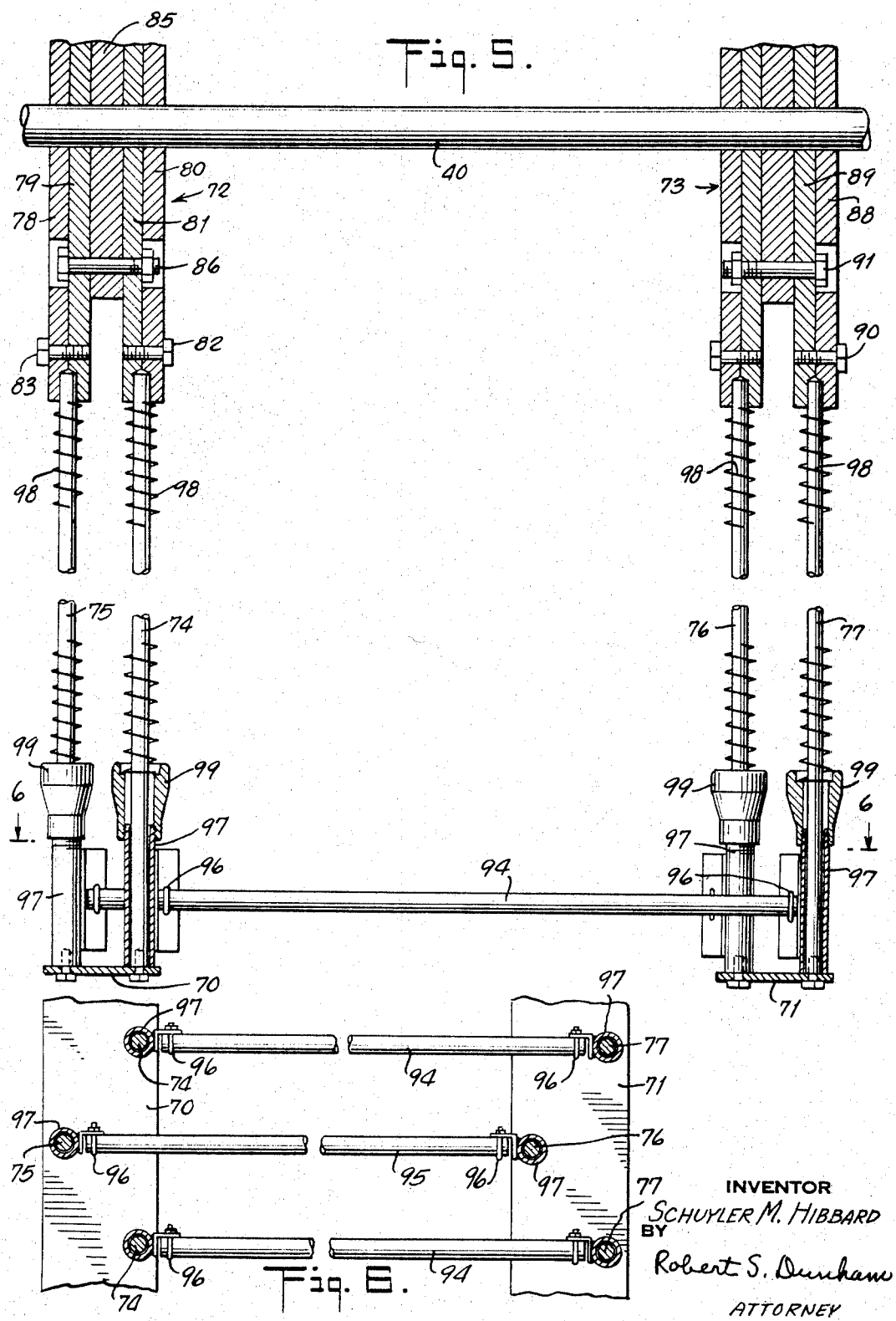

Dec. 10, 1968 S. M. HIBBARD 3,415,045
HARVESTING APPARATUS AND METHOD
Filed July 7, 1966 5 Sheets-Sheet 5
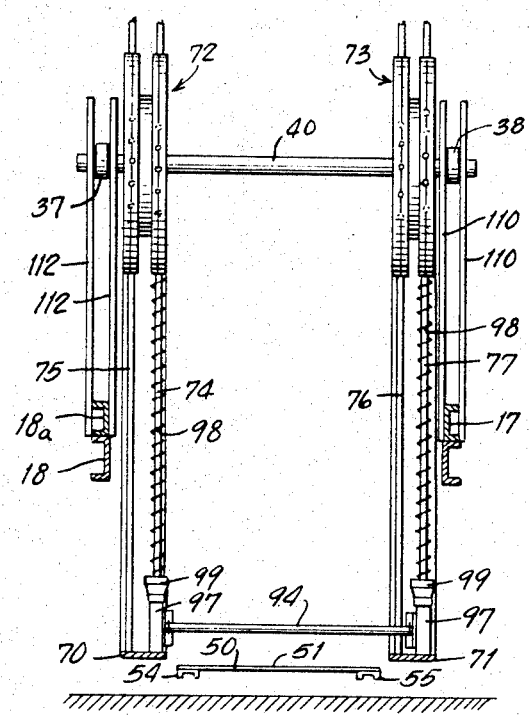
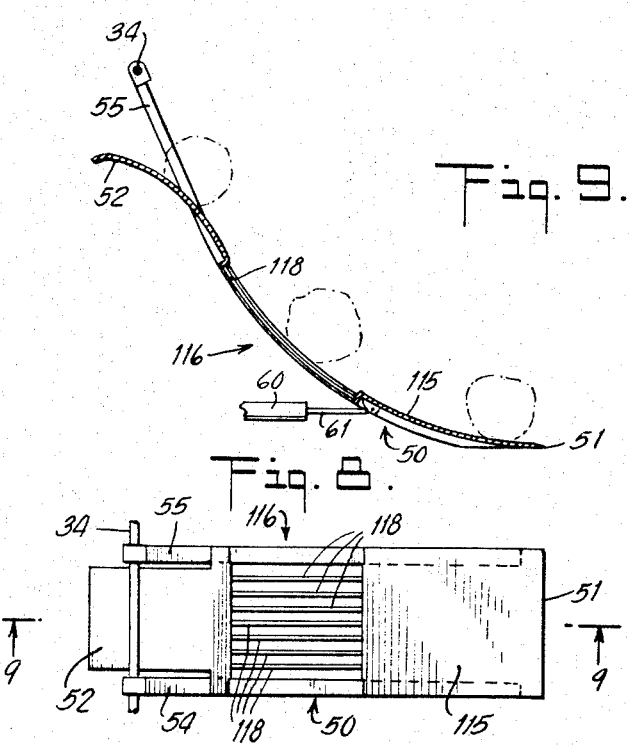
INVENTOR
SCHUYLER M. HIBBARD
BY
Robert S. Dunham
ATTORNEY

United States Patent Office 3,415,045
Patented Dec. 10, 1968

3,415,045
HARVESTING APPARATUS AND METHOD
Schuyler M. Hibbard, 212 Florence Ave.,
Penn Yan, N.Y. 14527
Filed July 7, 1966, Ser. No. 563,524
18 Claims. (Cl. 56—153)

This invention relates to apparatus and methods for harvesting produce and is more particularly concerned with harvesting cabbages or the like through the instrumentality of power-driven equipment which severs, picks up and collects the successive articles.

Cabbage is conventionally planted in long rows, and in the course of growth, the plants develop the expected heads on short stems, relatively close to the ground. There may be some variations in position of the cabbage heads transversely of the row, and likewise in their spacing along the row, so that any harvesting operation must take account of a possible random location of the articles. While the head structure of cabbage is generally dense and tight, there are outer, relatively loose leaves which tend to surround the head and especially the stem and in effect screen the latter for a considerable space in all directions. Moreover, care must be taken to avoid any heavy blow against the head, or abrasion of the inner, packed leaf structure.

The somewhat random positioning and varying dimensions of cabbage heads, their considerable size and weight, the interfering effect of the outer leaves and the necessity to avoid damage to the head structure has made it difficult to achieve satisfactory mechanical operations for harvesting this kind of produce. Devices appropriate for digging or raking up relatively hard articles are inappropriate, and jaw or like elements suitable for picking up smaller produce are similarly unavailable; as for instance, if the last-mentioned devices are made heavy enough to grasp or pluck a cabbage head, there is accompanying danger of damaging it.

Accordingly, a chief object of the present invention is to provide improved means and methods for mechanically harvesting cabbages and depositing them in suitable receiving means that may be moved along with the harvester. Further and more specific objects are to achieve these results with elements which exert relatively gentle action against the heads of produce, and which are adapted to find and engage the heads, so to speak, regardless of positional variation both crosswise and lengthwise of the area of a row. Other objects include the provision of improved equipment of this sort which may be hauled by a conventional farm tractor or similar machine and which may be driven as necessary by the conventional power take-off of the tractor. Another object is to afford apparatus of the defined character, which is mechanically sturdy and relatively simple to operate.

For these and other purposes, the apparatus of the invention comprises a cylindrical harvesting wheel which is supported by a suitable carriage so as to turn on a transverse horizontal axis as it travels along a row of cabbage, and which is in effect constituted with a flexible cylindrical wall adapted to embrace the cabbage heads in succession. Cooperating means are provided for severing the stalk beneath the head, either by cutting it or breaking it, or by both types of action, so that the harvesting wheel, continuing its rotation, further serves to advance the severed cabbage heads to suitable receiving means arranged on the carriage or otherwise disposed to travel with it.

In a more specific aspect, as will be apparent in the example of the apparatus herein shown and described, the cylindrical periphery of the harvesting wheel is constituted by a multiplicity of closely spaced, transverse, parallel rods, each of which is mounted to move radially inward of the wheel, against suitably resilient supporting means. The wheel is disposed and driven so that it turns continuously with its lowermost region spaced slightly above the ground. As it encounters a cabbage head, the transverse rods are pushed inward by the head, to the extent necessary for the latter to be embraced or partially surrounded by the rods which it engages. A blade or plate, arranged beneath the wheel and having a transverse edge, cuts or coacts in breaking the stem or stalk, while the rods, now surrounding the top and sides of the cabbage head, carry such head along and up a curved pathway to a locality where the head is allowed to fall or roll into suitable receiving structure. The severing edge may advantageously be constituted at the lower end of an elongated, curved plate which provides the defined pathway, close to the wheel. The apparatus is thus designed to function continuously during its travel along the cabbage row, similarly handling and removing the successive heads, and all without damaging them in any way.

Figure 4:
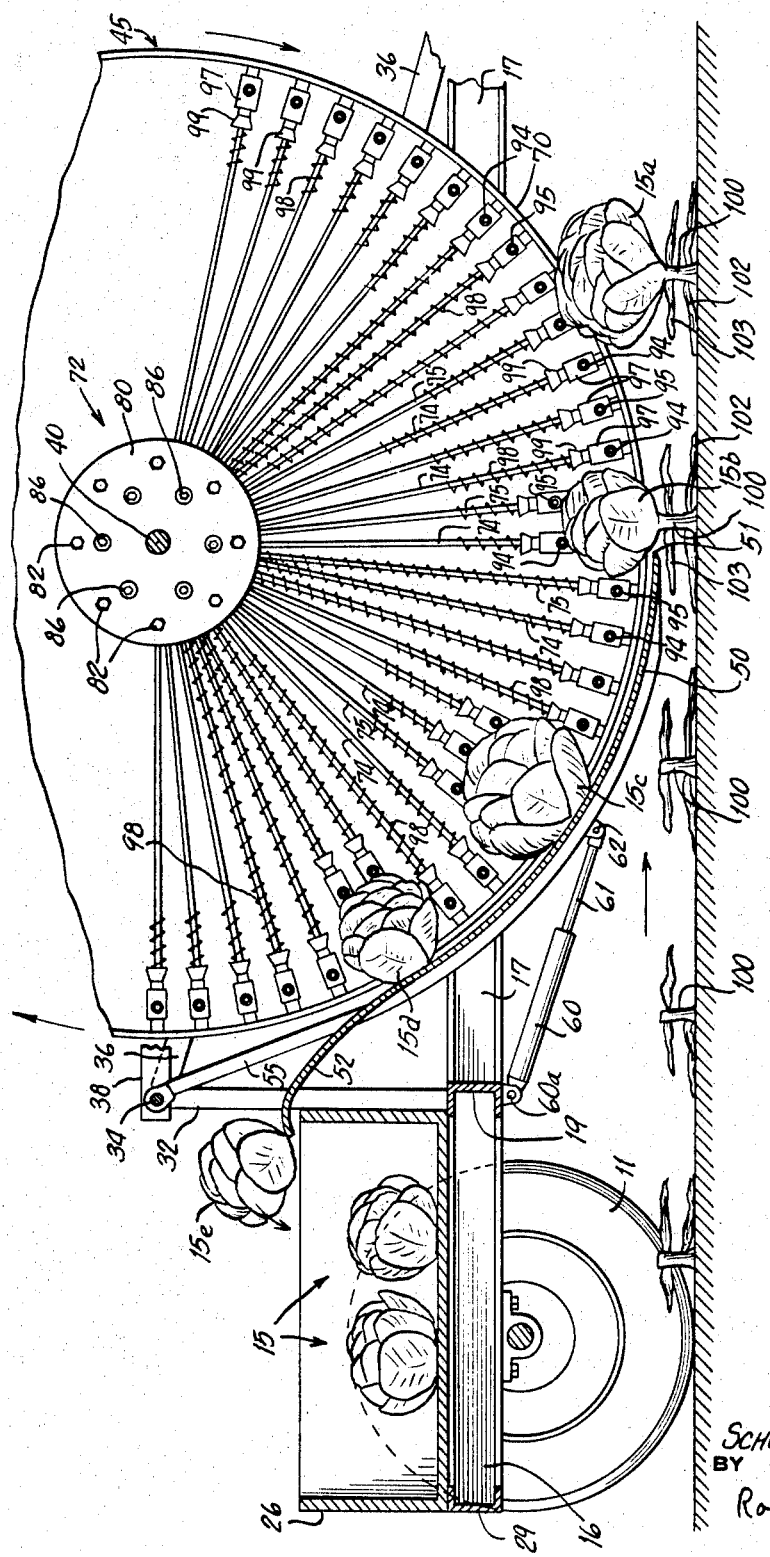

Further features of the apparatus and of the related method for harvesting cabbages or the like, are set forth in the following description of a presently preferred embodiment, shown in the accompanying drawings as follows:

FIG. 1 is a plan view of the harvester;
FIG. 2 is a plan view on a greatly reduced scale, showing the harvester coupled to a tractor, for hauling it along a row of cabbages;
FIG. 3 is a side elevation of the apparatus of FIG. 1;
FIG. 4 is a fragmentary, longitudinal vertical section, on a somewhat larger scale, taken along the line 4—4 of FIG. 1, illustrating operation in harvesting cabbages;
FIG. 5 is a fragmentary, transverse vertical section on a still larger scale, taken on line 5—5 of FIG. 3;
FIG. 6 is a fragmentary horizontal section on line 6—6 of FIG. 5;
FIG. 7 is a fragmentary vertical section essentially on line 7—7 of FIG. 3, but with parts of the main wheel removed and other parts seen as essentially in a vertical plane through the wheel axis;
FIG. 8 is a plan view of a modified guide plate structure; and
FIG. 9 is a vertical section on line 9—9 of FIG. 8.

Referring to the drawings and particularly FIGS. 1, 2, 3 and 7, the harvesting apparatus is embodied in a carriage 10 that includes a frame supported at the rear by wheels 11, 12 and that is arranged to be coupled by suitable coupling means 13 to a conventional tractor 14, in such fashion that the carriage 10 can be drawn along a row of cabbages 15, parallel to other rows of cabbages, as shown in FIG. 2. The frame of the carriage includes spaced, parallel longitudinal members 16, 17 and 18, with a connecting cross member 20 between members 16 and 17 and a like, longer cross member 19 joining rearward localities of all three elements 16, 17 and 18. A forward part of the member or beam 18 is constituted by an overlapping member 18a, raised for better clearance of the cabbage plants. The longitudinal member or beam 16 extends forwardly of the assembly, as shown at 21, being reenforced through its forward portion by an abutting member 22 secured to it, the members 21 and 22 being welded at their forward end to the coupling element 13, which may be of conventional construction, as for seating over the coupling pin 13a of the tractor 14 (FIG. 3).

Further frame structure as at 24 extends rearwardly of the cross member 19, being in part an extension of the member 16 and in part other structure secured to it and to the member 19. This last-mentioned portion of the frame is arranged to support suitable means for receiving the harvested cabbages, such means being indicated as an open box 26. The frame further includes an angularly disposed cross member 28 at the front of the carriage between members 16 and 17, cooperating with bracing members 29, 30 to impart strength and rigidity to the frame, especially the forward coupling assembly 21, 22. The cross member 28 has a further, overlapping part 28a extending to the member 18a and similarly raised for clearance.

The frame also carries a pair of upright members 31, 32 (see FIG. 4), which rise from the rear ends of the members 17, 18 and are tied together at the top by a cross-rod 34. Suitable bracing for these uprights is provided, as by the sloping member 35 between the upright 31 and frame member 18, and the sloping, diagonal member 36 between the upright 32 and the junction of members 21 and 28. Pivotally supported on the rod or bar 34, a spaced pair of arms 37, 38 extend forwardly to a central locality above the main frame assembly and there, at their ends carry a transverse shaft 40, the latter being supported for rotation in appropriate bearings (not detailed) on the members 37, 38, and having an extended portion 42 at one side. The main harvesting wheel, generally designated 45, is carried on the shaft 40, so as to be rotatable with its lower part turning through a frame opening defined by the members 17, 19, 18, 18a and 28a. The outer ends of the arms 37, 38, adjacent to the bearings for the shaft 40 are adjustably supported in the upper position, for example by hydraulically adjustable means, such as the hydraulic cylinder 46 and its co-acting piston rod 47, extending between the frame member 18 and the arm 37 as shown in FIG. 3. It will be understood that a like hydraulic cylinder arrangement, not shown, extends between member 17 and arm 38.

The harvesting wheel 45, which is intended to turn in the direction of the arrows in FIGS. 3 and 4, and thus in the same direction as the supporting wheels 11, 12, co-acts with a severing and guide plate 50 below it. As will be described, the wheel 45 is essentially a cylinder, arranged on a cylindrical axis and constructed to provide, in effect, a flexible wall that embraces successive cabbage heads and carries them up the guide plate 50 for deposit in the box or other receiving means 26.

The guide plate 50 has a width to extend across all or a major part of the flexible wall structure of the wheel 45, and provides a curved surface extending from a forward edge 51, below the wheel axis, along a rearward, upwardly curved path which is slightly spaced from but conforms with the cylindrical wheel surface. At an upper locality, which may be below the level of the wheel axis, the guide plate 50 is curved outwardly and rearwardly through a section 52 so that successive cabbage heads are guided for deposit into the box 26. The plate 50 is supported and re-enforced along its sides by a pair of correspondingly curved bars 54, 55 which are pivotally carried at their upper ends on the cross rod 34. The assembly of the guide plate 50 and the bars 54, 55, located beneath its side regions 56, 57 of the plate, is supported in a position adjustable about the rod 34, as by means of a hydraulic cylinder 60 and its coacting piston rod 61 (FIGS. 3 and 4), connected between an anchorage 60a on the underside of the cross member 19 and a like anchorage 62 at an intermediate locality of the guide plate assembly. Thus when the harvesting wheel 45 is moved up or down by the hydraulic means including the cylinder 46, the guide plate 50 can be similarly changed in position by actuating the hydraulic cylinder 60 so as to preserve a desired relation of close spacing between these assemblies.

While conceivably means might be provided for driving the wheel 45 by appropriate tire or like bearing structure in contact with the ground at laterally outer localities, a special and preferred feature of the invention involves a positive, power drive for the wheel. In this way the wheel 45 may be set at an optimum position above the ground for the harvesting function which it serves in cooperation with the guide plate 50, to suit any one of various conditions of use. Furthermore the best harvesting function may in some cases be achieved by turning the wheel at a selected speed of rotation that may differ in accordance with circumstances, being faster or slower than might be achieved by drive from ground contact. Thus for the desired independent drive the extended portion 42 of the wheel shaft 40 (FIGS. 1 and 2) is connected in suitable right-angle gearing indicated at 64 (such as conventional bevel gears, not shown) from which a drive shaft may extend for coupling with a conventional power take-off in the tractor 14. This shaft may comprise a short shaft portion 65, a universal joint 66 and a long shaft portion 67. The other end of the shaft portion 67 is coupled, through further universal joint connection (not shown) if necessary, to a power takeoff or transmission device 68 (of the tractor 14), which is driven by the tractor engine and which may be of conventional nature in such vehicles and is therefore not illustrated.

The harvesting wheel 45 comprises a pair of spaced rims 70, 71 each being a cylindrical band of metal as shown. These rims 70, 71 are carried at the ends of a multiplicity of spokes which are in turn seated in corresponding hub assemblies 72, 73 (see especially FIGS. 1, 4, 5, 6 and 7) secured on the shaft 40. The spokes are provided, in regular, uniform spacing, completely around the wheel; their omission from some localities in FIGS. 3 and 4 is merely for clarity or simplicity of illustration in these drawings. There are two closely adjacent rows of spokes for each of the rims, arranged in each case in staggered relation, as best shown in FIGS. 5 and 6; thus between the rim 70 and the hub 72 there are inner and outer rows of spokes 74, 75 and likewise inner and outer spokes 76, 77 for the rim 71 and hub 73.

Although other hub constructions may be employed the arrangements shown are as now described for the assembly 72, which consists of pairs of circular plates 78, 79 and 80, 81, each having semi-cylindrical radial recesses adjacent and intersecting its edge so that the plates of each pair may be clamped together, as by bolts 82, 83 to hold the inner ends of the spokes 74, 75 in corresponding sockets formed by the opposed recesses of the plates. The two assemblies of plates are then bolted together with a spacing plate 85 between them, by bolts 86, the whole being appropriately secured on the shaft 40 as by a key or other means not shown. An identical arrangement of plates is provided for the hub 73 (as seen in FIG. 5) including an outer pair of plates 88, 89 clamped by bolts 90 to hold the spokes 77, and secured to the remaining, like parts of the hub assembly 73 by bolts 91.

As explained above, the wheel 75 is characterized by a cylindrical periphery which is in effect a flexible surface biased outwardly into cylindrical shape. This structure is conveniently constituted by a multiplicity of transverse rods 94, 95, extending between selected spokes that are associated with the rims 70, 71. Thus the rods 94 extend between the spokes 74 and 77, and the rods 95 between the spokes 75 and 76. By clamp elements 96 at their ends, the rods 94, 95, are secured to traveling sleeves 97 on the respective spokes, so that the rods can be moved inwardly, i.e. radially toward the shaft 40, with the sleeves 97 sliding on the spokes. Appropriate means, advantageously of resilient or elastic nature, is provided to bias the rods 94, 95 radially outward, i.e. into a normal position where the sleeves 97 seat against the inner faces of the rims 70, 71. In such position the multiplicity of rods 94, 95, which are arranged in closely spaced, parallel array entirely around the wheel 45 (FIG. 2), constitute the desired cylindrical surface.

The resilient means, in the embodiment shown, is constituted by coil springs 98 around the spokes 74, 75, 77; each such spring extends, under compression, between a peripheral edge region of one of the hub plate assemblies 72, 73 and a cup-shaped socket 99 carried by the inner end of each sleeve 97. It will thus be seen that the transverse rods 94, 95 are movable radially inward against the springs 98 when appropriate pressure is exerted on the rod, and the springs then serve to restore the rods to their normal outer position when such pressure or force is removed. In this fashion the surrounding wall of the wheel 46 constitutes a cylindrical structure which is flexible or movable inward at all of its localities, to any desired degree, being resiliently biased outward at all times.

Referring now again to FIGS. 1, 2, 3 and 4, it will be appreciated that as the tractor 14 hauls the harvester 10 along the row of cabbages 15 while the wheel 45 is driven to roll over the successive cabbage heads, the rods 94, 95 are caused to abut the latter in succession. The relation of the described equipment to the planted rows is such that the wheels of the tractor 14 appropriately travel between rows, and the harvester carriage wheels 11, 12 are spaced to bridge one or two planted rows. With reference also to FIG. 4 it will be seen that as the surface constituted by the rods 94, 95 rolls down over successive cabbage heads 15a, 15b, those rods which abut each head are pushed inwardly of the wheel in the manner indicated, for example, in the situation of the head 15b.

Thus in affect the head 15b is embraced by the several rods adjacent to it, including the rod 94 which is forward of the article in the path of travel and the rod 95 which is immediately to the rear in such path, so that the cabbage head 15b is firmly but gently held by rods surrounding it, at least by the time the leading edge 51 of the guide plate 50 reaches the region of the stem 100 of the head. The continued rotation of the wheel 45 in a clockwise direction (FIG. 4) and continued advance of the plate 50 along the row causes the edge 51 (which is preferably sharp) to engage the cabbage stem 100, cutting the latter or causing it to be broken off by the rearward travel of the cabbage head in the wheel. It will be understood that cabbage stems are relatively fragile, but whether the stem is actually cut or is broken off or whether the action is a combination of these functions, the head is severed at the region of the stem. The wheel 45, with the rods still embracing the head, then continues to push the article rearwardly and upwardly along the guide plate 50, as shown with respect to the severed heads 15c and 15d in FIG. 4. Finally as the cabbage heads successively reach the rearwardly turned portion 52 of the guide plate and can move away from the wheel, the springs 98 restore the rods to their full outward position, urging the cabbage head away, for discharge over the end of the guide plate portion 52, i.e. as shown by the head 15e.

In the described fashion, successive articles along the planted row are grasped or embraced by the rods constituting the flexible cylindrical wall of the wheel 45, and are brought against the edge 51 of the guide plate, to sever the head from its stem. By the same motion of the wheel, the severed heads are carried up and deposited in the receiving means, such as the box 26. As will be understood, the vertical position of the wheel 45 and likewise the vertical position of the guide plate 50 are adjusted for best cooperation with the expected situation of the cabbage heads, particularly so that leading edge 51 engages the stalk or stem below the head and permits severing of the head without damage to it. Most usually, there are relatively loose leaves surrounding the stalk at its lower part, the position of the plate 50 being then conveniently selected so that at least some of these leaves are depressed toward the ground and are left there when the stem is severed.

Loose leaves of the above sort are indicated in a general way at 102, 103 in FIG. 4, and indeed there are usually more such leaves than the few here shown for clarity. In presently preferred adjustment for operation, the harvesting apparatus is intended to function so that not only the lowermost leaves 102, which lie on the ground, but also leaves 103 at an upper position, will tend to remain behind or even to be broken off, as the wheel 45 embraces the cabbage heads and carries the latter past the edge 51 and up the plate 50.

In general, depending on planting and growth conditions, the guide plate edge 51 can be set in a position of one inch to four inches from the ground, while the wheel 45 can conveniently be disposed so that cylindrical envelope of its rods (at their radially outer surfaces, in normal position) is an inch or two above the plate 50; these relationships may be somewhat different if special circumstances require. It is believed that for best results the wheel 45 should be generously proportioned, in the manner shown, and should have as many movable rods or bars 94, 95 as possible, for example a total of 64 rods for a wheel approximately seven feet in diameter. While the guide plate edge 51 can be of diagonal, curved or other special shape, it is generally effective in simple, straight form, perpendicular to the path of travel, as in FIG. 2. It will also be appreciated that conventional fluid pumping, supply and control means are provided for operation of the hydraulic cylinders 46 (and its companion as described) and 60, but being of known character, such devices are not illustrated.

The frame structure for the harvester may assume any suitable form appropriate for the desired support of the wheel 45 and the guide plate 50, either arranged to be drawn by a tractor as shown, or to be self-powered or to be mounted for pushing ahead of a tractor. It is found desirable in some cases to provide supplemental means for holding the wheel against any tendency to shift or swing sideways. Thus as seen in FIGS. 1, 3 and 7, pairs of upright members 110, 110 and 112, 112 are mounted respectively on the horizontal frame members 17, 18a, i.e. at opposite sides of each frame member so as to provide tall vertical slots at locations beside the wheel, somewhat forward of its axle 40, as best seen in FIG. 7. The members or arms 37, 38, in which the axle 40 is journaled, have portions respectively extending some distance forward of the axle or shaft 40 (FIGS. 1 and 3), so as to ride in the vertical slots respectively constituted by the elements 112, 112 and 110, 110. In this way, the mounted wheel 45 is positively prevented from swinging to either side, yet the freedom of the arms 37, 38 to slide up or down in the described slots permits desired vertical adjustment of the wheel position, e.g. by the means including cylinder 46.

FIGS. 8 and 9 show a modified and presently preferred form of the guide plate structure 50, wherein the upper, cabbage-discharging section 52 is of solid plate form as in the preceding views, and likewise a lowermost portion 115 terminating in the cutting edge 51, but at a central area 116 of the assembly the guiding surface is constituted by a row of spaced parallel rods 118 extending lengthwise, parallel to the arms 54 and 55, in the space between such arms. Thus for example, a solid plate structure extends rearwardly from the edge 51 for about two feet or more, and then for a like distance the guide means up which successive cabbage heads are pushed is constituted by an open grating 116 or other perforate structure the cabbages eventually being advanced over the further solid metal part 52. With this arrangement of FIGS. 8 and 9, any dirt which might be scooped up by the edge 51 in passing over uneven ground, and which might be pushed along with the cabbages on the guide plate 50, will tend to fall through the openings between the rods 118, and will not be brought all the way up into the cabbage-receiving means 26.

Although a particularly advantageous embodiment of the harvester may include further processing means mounted on the carriage, such as conventional apparatus for removing excess or loose leaves (i.e. a device known as a topper), which can be disposed to receive the heads directly from the guide plate 52, the drawings show, for simplicity, a plain receiving box 26. That is to say, further processing of the cabbage heads can be accommodated directly on the carriage if desired, and the harvested articles thus in effect collected in condition for immediate shipment, but the mechanical nature of such further equipment does not itself form part of the present invention, and being well known, is not illustrated.

For clarity the spacing of the cabbage heads is illustrated as fairly regular, but it will be appreciated that the harvesting operation is equally effective with irregular spacing lengthwise of the row and with considerable variation sidewise as well. In all instances, two or three or more rods 94, 95 are pushed inwardly by each article to surround the latter and hold it for the described travel against the edge 51 and thereafter up along the guide plate 50. Likewise, of course, multiple arrangements of harvesting wheels 45, parallel to each other, may be provided with one or more carriages drawn by the tractor 14 for simultaneous harvesting action of two or more rows; for example, with a suitably enlarged carriage a pair of harvesting wheels 45, parallel to each other, can be used, to travel together along two adjacent rows, harvesting cabbages in each row. As indicated hereinabove, the harvester can be arranged for drive and advance in other ways, one such arrangement, suitable for multiple units, being to dispose the frame or carriage to be pushed by a tractor of known type constructed for moving agricultural equipment that is carried ahead of it.

It is to be understood that the invention is not limited to the specific operations and devices herein shown and described, but may be carried out in other ways without departure from its spirit.

I claim:

1. Apparatus for harvesting articles of produce consisting of cabbage heads or the like, comprising frame means, wheel means associated therewith for rotation on a horizontal axis, said frame means and wheel means being arranged to be advanced along a row of said articles with the wheel means turning to abut successive articles in the row, said wheel means having a surface of revolution which comprises structure movable radially inward, to engage each article abutted by the wheel means, for displacing the article, and means providing a guiding surface extending rearwardly below the wheel means, upon which the wheel means displaces successive articles that are engaged by said movable structure.

2. Apparatus as defined in claim 1, in which said radially movable structure comprises a multiplicity of radially movable elements distributed around the wheel means and biased toward the articles below the wheel means, for embrace of each abutted article by a plurality of said elements.

3. Apparatus as defined in claim 1, in which the frame means has associated means bearing on the ground, to carry the wheel means, and is arranged to support said wheel means with its lower portion spaced above but close to the ground.

4. Apparatus as defined in claim 3, which includes adjustable supporting structure intermediate the frame means and the wheel means, for positioning the wheel means at a desired elevation above the ground.

5. Apparatus as defined in claim 4, in which the guiding surface means includes edge structure beneath the wheel means for engaging lower portions of successive articles in the row for coaction with the wheel means to sever the articles, and which includes adjustable supporting structure intermediate the frame means and said guiding surface means, for positioning said edge structure at a desired elevation.

6. Apparatus as defined in claim 3, in which the frame means includes means for coupling same to a driving vehicle, and said wheel means has associated transmission means for coupling to a source of motive power for rotating the wheel means.

7. Apparatus for harvesting articles of produce consisting of cabbage heads or the like, comprising frame means, wheel means associated therewith for rotation on a horizontal axis, said frame means and wheel means being arranged to be advanced along a row of said articles with the wheel means turning to abut successive articles in the row, said wheel means having a surface of revolution which comprises structure movable radially inward to engage each article abutted by the wheel means, for displacing the article, and means including edge structure below the wheel means for engaging a lower part of each article that is engaged by said radially movable structure, to sever the article for displacement by the wheel means.

8. Apparatus as defined in claim 7, which includes a guide plate disposed beneath the wheel means and extending upwardly and rearwardly thereof, said plate having a forward edge to constitute the aforesaid edge structure, and said plate being disposed close to the wheel means, for movement of severed articles by the wheel means along said plate, to be discharged rearwardly of the plate.

9. Apparatus as defined in claim 8, which includes means supported by the frame means for receiving the severed articles, said guide plate including a rearward portion extending to said receiving means, for movement of articles advanced by the wheel means along the plate, over said portion into the receiving means.

10. Apparatus as defined in claim 7, in which the radially movable structure of the wheel means comprises a multiplicity of parallel elements which are disposed in a cylindrical array around the wheel means and are mounted to move radially inward of the wheel means, and means for urging said elements radially outward.

11. Apparatus as defined in claim 10, in which said element-urging means comprises spring means associated with the elements, for biasing each element separately into outward position.

12. Apparatus as defined in claim 11, in which the wheel means comprises a pair of wheel structures laterally spaced to accommodate a row of articles between them, each wheel structure comprising a hub, a rim and a multiplicity of spokes therebetween, said parallel elements being each disposed between opposed spokes of the respective wheel structures and having mounting portions disposed to slide on said last-mentioned spokes.

13. Apparatus as defined in claim 12, in which the spring means for each element comprises coil springs on said last-mentioned spokes on which the element slides each disposed in compression between the adjacent hub and the adjacent mounting portion of the element.

14. Apparatus as defined in claim 13, which includes: a guide plate disposed beneath the wheel means and extending upwardly and rearwardly thereof, said plate having a forward edge to constitute the aforesaid edge structure, and said plate being disposed close to the wheel means, for movement of severed articles by the wheel means along said plate, to be discharged rearwardly of the plate; adjustable supporting structure for the wheel means, carried by the frame means, for positioning said wheel means with its lower portion at a desired elevation above the ground; and adjustable supporting structure for said guide plate, carried by the frame means, for positioning said edge structure at a desired elevation below the wheel means; said frame structure having means to bear on the ground, in rolling contact therewith, to enable the apparatus to be driven along a row of articles, and said wheel means having associated means for delivering motive power thereto, for rotating the wheel means.

15. Apparatus as defined in claim 8, in which the guide plate comprises perforate structure for allowing passage of particulate matter through it while supporting the severed articles to be moved rearwardly along the plate.

16. Apparatus as defined in claim 15, in which the perforate structure comprises an array of spaced, parallel bars lengthwise of the path of the severed articles and distributed across said path.

17. Apparatus as defined in claim 7 which includes substantially horizontal arm means extending lengthwise of the frame means and adjacent the wheel means for rotatably supporting said wheel means at the axis thereof, said arm means having supporting means on the frame means spaced remotely lengthwise from said wheel axis, and said arm means being mounted on said supporting means to rock vertically for adjustment of the vertical position of the wheel means, and upright guide structure carried by the frame means adjacent the arm means, to prevent lateral displacement of the wheel means.

18. Apparatus for harvesting articles of produce consisting of cabbage heads or the like, comprising frame means, wheel means associated therewith for rotation on a horizontal axis, said frame means and wheel means being arranged to be advanced along a row of said articles with the wheel means turning to abut successive articles in the row, said wheel means comprising a laterally spaced pair of wheel structures each comprising circular rim means and radial supporting means between the rim means and the axis of the wheel means, and means comprising a large multiplicity of transverse members extending between the wheel structures and distributed around the wheel means, said transverse members being resiliently movably mounted for movement inward of the wheel means and arranged for embrace of each individual article collectively by a group of said members as the wheel means comes into engagement with successive articles in the row, to effect displacement of each article by and with the turning of the wheel means.

References Cited
UNITED STATES PATENTS

| | | | |
|---|---|---|---|
| 2,510,474 | 6/1950 | Kugler | 56—153 |
| 2,643,754 | 6/1953 | Doak | 56—328 X |
| 2,729,046 | 1/1956 | Patterson | 56—328 |

RUSSELL R. KINSEY, *Primary Examiner.*

U.S. Cl. X.R.

56—327